Figure 1:
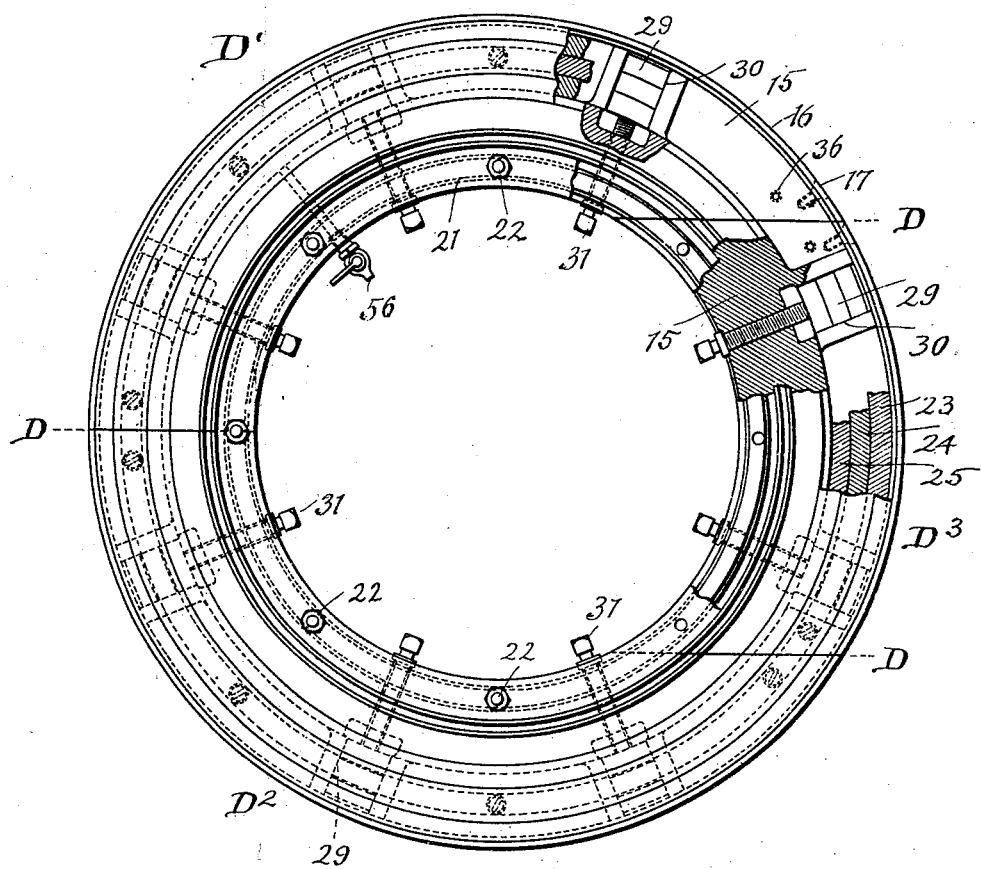

W. G. FORDING.
EXPANSIBLE AND COLLAPSIBLE CORE FOR TIRE CASINGS.
APPLICATION FILED FEB. 10, 1919. RENEWED JAN. 10, 1921.

1,373,229.

Patented Mar. 29, 1921.

3 SHEETS—SHEET 1.

Inventor,
William G. Fording.
By
Thurston & Kwis
attys.

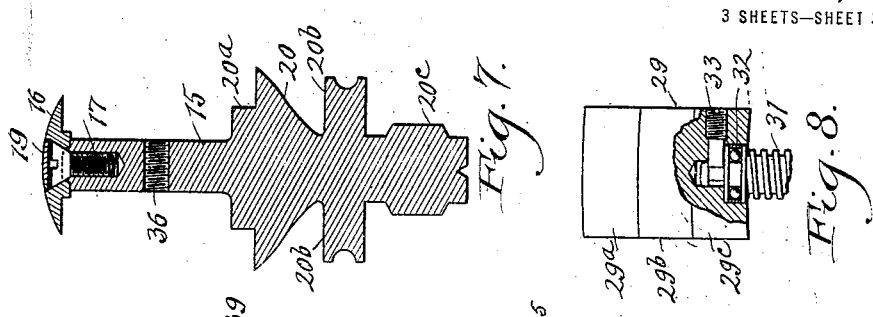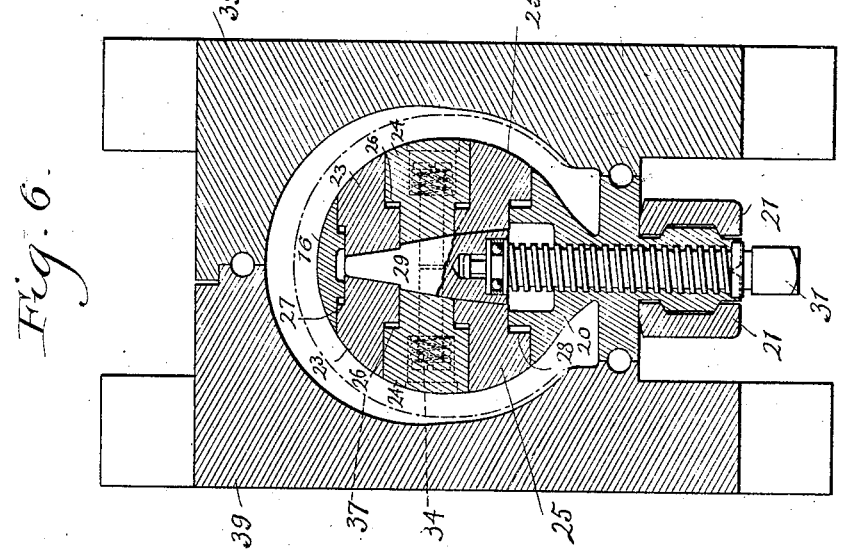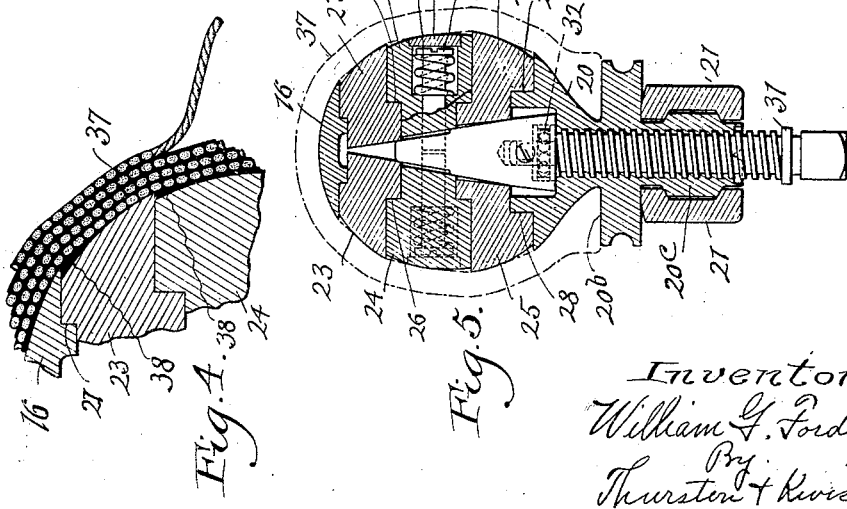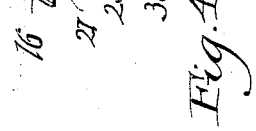

UNITED STATES PATENT OFFICE.

WILLIAM G. FORDING, OF LAKEWOOD, OHIO.

EXPANSIBLE AND COLLAPSIBLE CORE FOR TIRE-CASINGS.

1,373,229.     Specification of Letters Patent.     Patented Mar. 29, 1921.

Application filed February 10, 1919, Serial No. 275,979. Renewed January 10, 1921. Serial No. 436,390.

*To all whom it may concern:*

Be it known that I, WILLIAM G. FORDING, a citizen of the United States, residing at Lakewood, in the county of Cuyahoga and State of Ohio, have invented a certain new and useful Improvement in Expansible and Collapsible Cores for Tire-Casings, of which the following is a full, clear, and exact description.

This invention relates to a collapsible and expansible core for use in building and vulcanizing pneumatic tire shoes or casings.

One of the principal objects of the invention is to provide a core with expansible parts, so formed or arranged and operated that when the core is expanded the individual layers of the casings will be under the desired tension, and the tendency for certain layers to buckle is eliminated. Further, the invention aims to provide a core which when expanded in the tire casing will have a smooth exterior of the desired shape, and will cause an equal distribution or spreading of the inner layer of gum or rubber compound, causing it to have the desired uniform thickness all around the innermost layer of fabric, so that after the casing is vulcanized its inner surface is smooth and free of irregularities.

Still further the invention aims to provide an expansible core whose movable or expansible members extending circumferentially around the same are operated together, or as a unit, but with a regulated outward movement so that the pressure will be applied to the tire casing uniformly all over its internal surface.

The core embodying my invention is made collapsible by dividing it in planes in the same way that the ordinary solid cores are divided to render them collapsible. Additionally, the individual sections (divided by the planes as aforesaid) and therefore the continuous core when the sections are assembled is composed of one or more portions, preferably inner and outer peripheral portions which are fixed or non-movable, but in addition to these fixed portions it has movable portions which may be moved laterally outward to expand the core.

These movable sections which extend around the core, though of course divided by the division planes, are moved laterally outward to expand the core, preferably by wedges which are arranged at intervals and are actuated simultaneously and in equal amounts by radially disposed screws or plungers, which in turn may be actuated in any desired manner, or by any convenient means.

I have provided also, means for contracting the core when the wedges are withdrawn or moved radially inward, this being accomplished preferably through the medium of springs whose tendency is to shift the movable sections to contracted position when the wedges are withdrawn.

The number of sections which are thus moved outwardly between the fixed inner and outer or peripheral portions of the core may be varied. In the preferred embodiment, three movable sections are provided on each side of the core, which sections have concentric abutting faces, though the invention may be embodied in other forms having more or less than the three contiguous sections on each side, an embodiment being shown in the drawings wherein there is simply one movable section on each side.

The invention may further be briefly summarized as consisting in certain novel details of construction and combinations and arrangements of parts which will be described in the specification and set forth in the appended claims.

Figure 2:
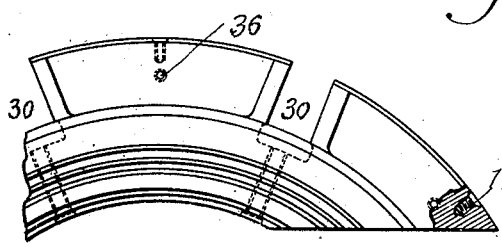
Figure 3:
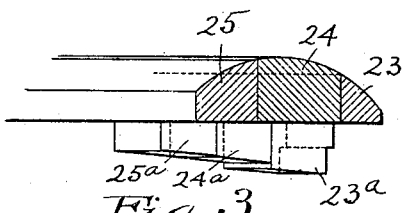
Figure 9:
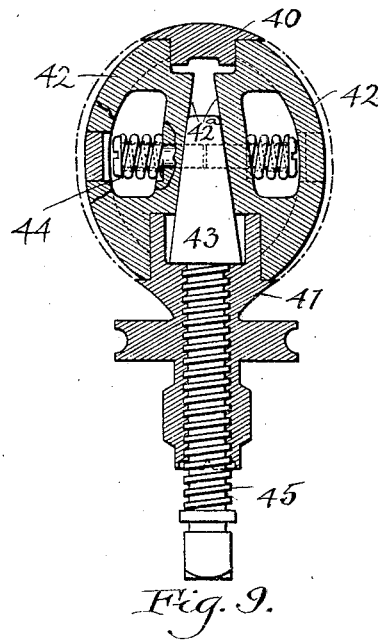
Figure 10:
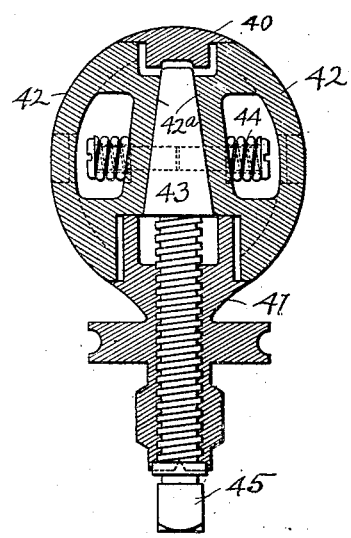
Figure 11:
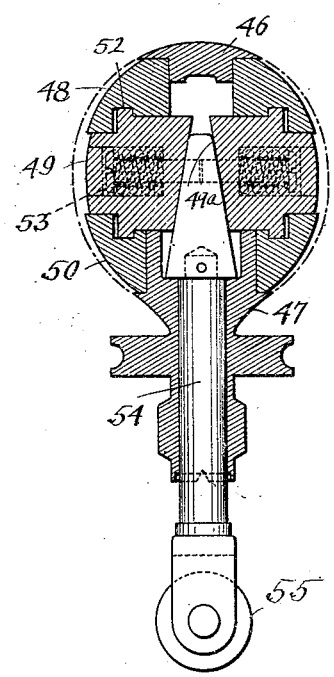
Figure 12:
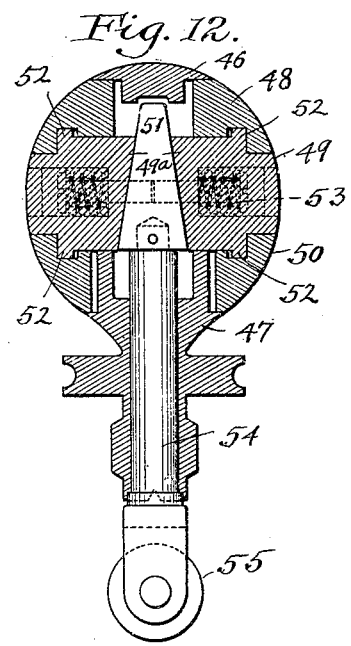

In the accompanying sheets of drawings showing certain embodiments of my invention which operate effectively, Figure 1 is a side view of the core with parts broken away and other parts in section, this core being constructed in accordance with the preferred form of my invention; Fig. 2 is a fragmentary view showing a portion of the main stationary ring of the core, this view showing one of the machined slots for one of the expanding wedges but omitting the piece forming the outer periphery or tread part of the core; Fig. 3 is a view partly in section and partly in side elevation of the three movable sections provided at each side of the fixed ring, this view showing on the inner sides of these sections tapered projections designed to be engaged by one of the expanding wedges; Fig. 4 is an enlarged sectional view showing a portion of the core and a portion of the tire casing arranged thereon with the parts of the core in the position that they occupy when the carcass is built thereon, and before the core is expanded for vulcanization; Fig. 5 is a cross sectional view through the core with the latter in its contracted condition, and showing by dotted lines the tire casing or carcass formed thereon ready for vulcanization; Fig. 6 is a sectional view of the same in a vulcanizing mold and with the core expanded; Fig. 7 is a sectional view through the fixed part of the core; Fig. 8 is a side view of one of the expanding wedges with parts broken away to show the manner in which it is connected to the actuating screw; Figs. 9 and 10 are cross-sectional views through a core showing a different embodiment of my invention, the core being contracted in Fig. 9, and expanded in Fig. 10; Figs. 11 and 12 are views similar to 9 and 10 showing a further modification.

Referring now to the drawings, and first to Figs. 1 to 8, it will be observed that as shown in Fig. 1, the core when assembled and ready for use is in the form of a complete annulus, which is divided along planes marked "D" in Fig. 1, into three sections $D^1$, $D^2$ and $D^3$. This manner of dividing the core to render it collapsible, so as to permit the core to be removed from the vulcanized tire casing is the same as the manner in which the ordinary solid core is divided, though in this instance the planes of division divide the laterally movable sections previously referred to, as well as the central fixed portion of the core.

The fixed part, i. e. the part which remains stationary during the expansion or contraction of the core, is shown in Fig. 7, and by referring to this figure it will be seen that this part consists of an irregular ring 15 (in three sections, of course, due to the division planes D), this ring having an outer peripheral part 16, secured to the body of the ring by screws 17, which are covered by plugs 19 to form a smooth exterior, and this ring includes also a lower or inner portion 20, stepped or shouldered as shown at $20^a$ to receive the innermost laterally movable sections, and provided with shoulders $20^b$ on which is adapted to be seated the bead parts of the casing.

It may be stated at this point that the three sections $D^1$, $D^2$ and $D^3$ of the core are designed to be held together so as to form the complete annulus by clamping rings 21 and transverse bolts 22 (see Fig. 1), engaging the innermost part $20^c$ (see Fig. 7) of the fixed ring 15 of the core, this portion which is engaged by clamping rings 21, being just inside of the part $20^b$, on which the bead portions of the casings are adapted to rest.

On each side of the flat central web of the fixed ring 15, that is to say, between the outer peripheral part 16 and the inner peripheral part 20, are arranged the laterally movable parts which render the core expansible. In the preferred embodiment I provide on each side of the core, or on each side of the fixed ring, three such laterally movable sections, having outer surfaces which when the core is expanded, register with, and form exact continuations of the outer surfaces of the inner and outer peripheral portions of the fixed ring, forming a smooth surface which conforms to the desired shape of the inner surface of the tire casing, but when the core is contracted, the surfaces of the fixed and movable parts move slightly out of alinement as illustrated in Figs. 4 and 5. While these sections may be formed in different ways, and operated with different instrumentalities, I prefer that they be formed substantially as shown in Figs. 4, 5 and 6, wherein the movable sections or rings on each side of the fixed ring are designated 23, 24 and 25, the rings on one side of the core being similar to those on the opposite side, and corresponding rings being directly opposite each other. The two rings 23 are next to and engage the inner surface of the outer peripheral part 16 of the fixed ring. The two rings 24 are between and engage the outer movable rings 23 and inner movable rings 25, and the inner rings 25 engage the outer stepped or shouldered part of the inner peripheral portion 20 of the fixed ring. The contacting surfaces of the several fixed and movable rings are annular surfaces concentric with respect to the axis of the core, so that the movable sections have a true lateral inward and outward movement, no gaps being formed between them when the expansion takes place.

It will be observed that the inner or central movable rings 24 have shoulders 26 which engage corresponding shoulders of the outer and inner rings 23 and 25, so as to draw the rings inward when the contraction of the core takes place, as will be explained, and the outermost rings 23 have shoulders 27 which are designed to engage corresponding shoulders of the outer peripheral portion 16 of the fixed ring, and the innermost rings 25 are provided with shoulders 28 which are adapted to engage corresponding shoulders of the inner peripheral portion of the fixed ring, the shoulders 27 and 28 engaging the shoulders of the fixed ring, as in Fig. 5, to limit the inward movement of the movable rings when the contraction of the core takes place on the withdrawal of the wedges or other means utilized to cause the expansion.

I prefer to use wedges such as shown at 29 in Figs. 5, 6 and 8 to expand the core. In the preferred form of my invention these wedges have on each side, three separate tapered wedging faces $29^a$, $29^b$ and $29^c$ which positively actuate the different movable rings, giving them the desired outward movement, which tapered faces engage tapered projections $23^a$, $24^a$ and $25^a$ on the inner sides or faces of the rings 23, 24 and 25.

The wedges have a radial movement as will be apparent from the drawings, and they are preferably arranged at regular intervals around the core. These wedges are mounted in radially disposed slots 30 provided in the web of the fixed ring 15, (see Fig. 2) which slots accommodate not only the wedges but also the tapered projections 23ª and 24ª of the rings 23 and 24, it being understood that the inner sides of the movable rings have sets of the projections 23ª, 24ª and 25ª, having the same circumferential spacing as the wedges. The wedges may be simultaneously moved radially outward and inward by any suitable means. In Figs. 1, 5, 6 and 8 they are moved by screws 31, each connected to one of the wedges by a ball and ring thrust bearing 32, and by a holding pin 33 (see Fig. 8) which allows the screw to turn or have a swivel action with respect to the wedge, and comes into play when the wedges are being retracted. These screws may be operated simultaneously by any suitable mechanism as by a series of socket wrenches driven from a central joint by gears.

To contract the core when the wedges are withdrawn, I make use of springs 34, which act on the middle rings 24 to pull them inwardly. These springs are located in sockets of the rings 24 and they surround fixed lateral bolts 35 which extend through openings of the middle rings and have their inner ends screwed into openings 36 (see Fig. 7) provided in the web of the fixed ring 15. The springs each bear at one end against the head of the corresponding bolt, and at its other end against the shoulder at the base of the socket of the ring, so that when the wedges are moved outwardly, the springs are compressed, and when the wedges are moved inwardly the springs cause the contraction of the core by the inward movement of all six rings to the position shown in Fig. 5, the inward movement of the outer rings 23 and of the inner rings 25 being caused by the engagement of the shoulders 26 of the middle rings with the corresponding shoulders of the inner and outer rings so that this simultaneous inward movement takes place though the springs act directly on the middle rings only. The outer ends of the sockets which receive the springs 34 are closed by plugs 36ª so as to leave a smooth exterior on the core. The number and spacing of these springs are indicated by dotted lines in Fig. 1.

With this invention the fabric portion of the tire carcass may be formed in any suitable manner, either of woven fabric or of cords. In Fig. 4 I have shown the fabric portion 37, formed of cords. In either event there is provided inside the fabric portion, or on the periphery of the core an inner layer of rubber which I have indicated in Fig. 4 by the reference character 38.

When the casing is first built on the core, the latter is, of course, in its contracted condition. The casing then assumes substantially the shape shown by dotted lines in Fig. 5, and as the periphery of the core is then somewhat irregular, the inner layer of gum or rubber compound is irregularly spread over the inner surface of the casing as indicated in Fig. 4. When, however, the casing and core are placed in the halves 39 of a vulcanizing mold, indicated in Fig. 6, and the core is expanded as indicated in that figure, both the inner and outer surfaces of the casing become smooth and the inner layer of gum 38 becomes evenly distributed over the inner surface of the casing. As the core is expanded, the desired uniform tension is placed in the different fabric layers, and there is eliminated all possibility of any of the layers buckling.

In Figs. 9 and 10 I have illustrated a collapsible expansible core embodying my invention, but provided on each side of the fixed central ring 15 with one laterally movable ring instead of three, as illustrated in the preceding figures. In this instance the fixed ring has an outer peripheral portion 40 and an inner peripheral portion 41, on which the beads of the casing are adapted to be seated, and in addition it is provided on opposite sides of the web of the fixed ring with two similar laterally movable rings 42, 42. These rings, of course, are divided along the planes D as in Fig. 1, so that the movable as well as the fixed rings are sectional, each section extending circumferentially around the core from one cutting plane D to the next.

These laterally movable rings 42, 42, are designed to be moved laterally by wedges 43 equally spaced and mounted in radial slots of the fixed ring precisely as in the preceding construction, but in this instance each wedge has on each side one taper instead of three, the two opposite similarly tapered faces of the wedge engaging tapered lugs 42ª on the inner sides of the rings 42, 42, there being one pair of lugs for each wedge.

These rings 42, 42, slide outwardly and inwardly on concentric parallel faces of the fixed inner and outer portions 40, 41; as in the preceding construction the rings 42, 42, are drawn inwardly by springs 44, which surround bolts screwed into the web of the fixed ring of the core. The operation of this core will be understood without further description, Fig. 9 showing it contracted, and Fig. 10 showing it expanded.

The wedges may be moved inward and outward by any suitable means, such as screws 45, as in the preceding construction, or by any other suitable means.

In Figs. 11 and 12 I have shown a further modification which in certain respects resembles the construction first described, and in other respects partakes of the characteristics of that illustrated in Figs. 9 and 10. In this case there are provided on each side of the web of the fixed ring and between the outer peripheral portion here designated 46 and the inner peripheral portion here designated 47, the three laterally movable rings 48, 49 and 50, but in this case, only the middle rings 49 are directly actuated by the wedges, here designated 51, which wedges engage tapered lugs 49$^a$ on the inner sides of the middle rings.

Movement is transmitted from the middle rings to the outer rings 48 and inner rings 50 by shouldered portions 52 on the rings 49, which shouldered portions engage in grooves of the rings 48 and 50, a slight lost motion being provided between the interfitting or interlocked parts as illustrated in the drawings. As in the preceding instances, the core is contracted by springs 53, which act on the middle rings 49 and are arranged or mounted as in the preceding cases.

In this construction when the wedges are moved radially outwardly they spread laterally the middle rings 49, which in turn move outwardly to the dotted line position the rings 48 and 50, and when the wedges are moved radially inward the springs contract the core by moving all six rings laterally inward. Figs. 11 and 12 show respectively the core in its contracted and expanded conditions.

It was previously stated that the wedges may be operated by means other than the screws 31 shown in connection with the two embodiments first described, and in Figs. 11 and 12 I have shown radially movable plungers 54 for operating the wedges, these plungers being provided at their lower ends with rollers 55. Obviously the wedge shifting means shown in Figs. 11 and 12 can be used in the construction of the preceding figures. When the plungers are utilized as in Figs. 11 and 12, a suitable device such as a taper ring will be employed to simultaneously engage all the rollers and simultaneously move the corresponding plungers radially outwardly equal amounts, so that a uniform expanding action is obtained all around the core.

In Figs. 9 to 12 the section is taken through the core substantially in the plane of one of the wedges, hence the web of the stationary ring is not shown, but the stationary ring for the construction shown in these views is similar to that shown in Fig. 7.

I may, if desired in any of the constructions provide a relief valve such as shown in Fig. 1 at 56, to allow air to enter the interior of the core when the expansion takes place, to avoid a partial vacuum which might tend to draw the soft rubber gum into the joints of the core. This valve would be closed before steam is admitted for vulcanizing purposes.

In the drawings I have shown several forms of an expansible collapsible core, which are practical in their construction and operation and attain the objects previously set forth in the specification, and overcome the disadvantages attending the use of the collapsible cores heretofore generally employed.

While I have shown several embodiments, I do not desire to be confined to the exact details shown or to any of the forms illustrated, and I aim in my claims to cover all modifications which do not involve a departure from the spirit and scope of my invention in its broadest aspects.

Having described my invention, I claim:

1. A core for use in producing and vulcanizing tire casings comprising an annular member composed of a fixed portion and laterally expansible or movable members and means for spreading or expanding the movable members laterally with respect to the plane of the core.

2. A core for use in building and vulcanizing tire casings comprising an annular member tire-shaped in cross section and composed of a fixed bead portion, and expansible members surrounding said fixed portion, and means for shifting said expansible members laterally with respect to the plane of the core.

3. A core for use in building and vulcanizing tire casings comprising an annular member composed of a fixed peripheral or tread portion and expansible members within said peripheral portion and movable laterally outward, and means for shifting said movable members.

4. A core for use in building and vulcanizing tire casings comprising an annular member including a fixed ring, and annular rings at the sides thereof, and laterally movable to render the core expansible, and means for shifting said movable rings.

5. A core for use in building and vulcanizing tire casings comprising an annular member having a fixed ring with inner and outer peripheral portions and between said portions having rings movable laterally to render the core expansible, and means for moving said movable rings.

6. A collapsible and expansible core for use in building and vulcanizing tire casings, said core being divided into arc-shaped sections, each section including a plurality of movable portions, and means for moving said portions outwardly laterally with respect to the plane of the core.

7. A collapsible and expansible core for use in building and vulcanizing tire casings comprising an annular member divided into arc-shaped sections, each section being composed of a fixed portion and movable portions, and means for moving the movable portions outwardly laterally with respect to the plane of the core to expand the core.

8. A collapsible and expansible core for use in building and vulcanizing tire casings, said core comprising an annular member divided into arc-shaped sections each composed of fixed and laterally movable portions which when the sections are alined in annular formation constitute fixed and laterally movable rings, and means for shifting said movable rings to expand the core.

9. A collapsible and expansible core for use in building and vulcanizing tire casings comprising an annular member divided into arc-shaped sections each section composed of a fixed ring section with inner and outer peripheral portions and between said portions with movable ring sections, said fixed and movable sections forming fixed and movable rings when the main arc-shaped sections of the core are assembled in annular formation, and means for moving the movable rings laterally outward.

10. A core for use in producing and vulcanizing tire casings comprising laterally movable portions which render the core expansible, means comprising radially movable wedges for expanding the core, and means comprising springs acting on the movable sections for contracting the core when the wedges are withdrawn.

In testimony whereof I hereunto affix my signature.

WILLIAM G. FORDING.